United States Patent
Uchanski et al.

(10) Patent No.: US 12,454,906 B2
(45) Date of Patent: Oct. 28, 2025

(54) ELECTRIC BOOST DEVICE CONTROL FOR TURBOCHARGER

(71) Applicant: Garrett Transportation I Inc., Torrance, CA (US)

(72) Inventors: Michael Robert Uchanski, La Tour de Peilz (CH); Malay Maniar, Boeblingen (DE); Andrew Love, Marina Del Rey, CA (US); Daniele Zecchetti, Maranello (IT); Jungsik Yim, Torrance, CA (US)

(73) Assignee: Garrett Transportation I Inc., Torrance, CA (US)

( * ) Notice: Subject to any disclaimer, the term of this patent is extended or adjusted under 35 U.S.C. 154(b) by 512 days.

(21) Appl. No.: 17/321,010

(22) Filed: May 14, 2021

(65) Prior Publication Data

US 2022/0364499 A1  Nov. 17, 2022

(51) Int. Cl.
F02B 37/04 (2006.01)
F02B 37/12 (2006.01)
F02D 23/00 (2006.01)

(52) U.S. Cl.
CPC .............. F02B 37/04 (2013.01); F02D 23/00 (2013.01); *F02B 2037/122* (2013.01)

(58) Field of Classification Search
CPC ..... F02B 39/10; F02B 37/04; F02B 2037/122
See application file for complete search history.

(56) References Cited

U.S. PATENT DOCUMENTS

| | | | |
|---|---|---|---|
| 6,637,205 B1 | 10/2003 | Ahmad et al. | |
| 6,705,084 B2 | 3/2004 | Allen et al. | |
| 7,174,714 B2 | 2/2007 | Algrain | |
| 2006/0287795 A1 | 12/2006 | Samad et al. | |
| 2009/0000298 A1 | 1/2009 | Barthelet | |
| 2012/0137681 A1 | 6/2012 | Hoess et al. | |
| 2012/0240910 A1* | 9/2012 | Yamashita | H02P 29/60 |
| | | | 123/564 |
| 2014/0305413 A1 | 10/2014 | Ahrns | |
| 2016/0003140 A1 | 1/2016 | Garrard et al. | |
| 2016/0131050 A1 | 5/2016 | Wu et al. | |
| 2016/0348578 A1 | 12/2016 | Oyagi et al. | |
| 2016/0356206 A1 | 12/2016 | Yamashita et al. | |
| 2017/0096952 A1 | 4/2017 | Yu et al. | |
| 2017/0145905 A1 | 5/2017 | Yamane | |

(Continued)

FOREIGN PATENT DOCUMENTS

| | | |
|---|---|---|
| DE | 102019201788 A1 | 12/2019 |
| EP | 3078832 A1 | 12/2016 |

OTHER PUBLICATIONS

Extended European Search Report for EP 22168107.5 issued Sep. 19, 2022, 7 pages.

*Primary Examiner* — Ngoc T Nguyen
(74) *Attorney, Agent, or Firm* — BelayIP

(57) ABSTRACT

New and/or alternative approaches to performance control in an engine system having a compressor configured to receive torque from each of a turbine placed in an exhaust output of an engine and an electric motor. A control unit for the electric motor, referred to as an ETurbo controller, is provided with each of a speed control signal and a torque control signal from an engine control unit. The ETurbo controller is configured to use the torque control signal and speed control signal to operate the electric motor without causing the compressor to exceed a speed boundary.

20 Claims, 7 Drawing Sheets

(56) References Cited

U.S. PATENT DOCUMENTS

| | | | |
|---|---|---|---|
| 2017/0145934 A1 | 5/2017 | Schnorpfeil et al. | |
| 2017/0152800 A1 | 6/2017 | Han et al. | |
| 2017/0260897 A1 | 9/2017 | Ehrhard et al. | |
| 2018/0001984 A1 | 1/2018 | Yamashita et al. | |
| 2018/0283267 A1* | 10/2018 | Xiao | F02D 41/123 |
| 2019/0338697 A1* | 11/2019 | Kelly | F02B 37/14 |
| 2020/0217242 A1 | 7/2020 | Yamashita et al. | |

* cited by examiner

ELECTRIC BOOST DEVICE CONTROL FOR TURBOCHARGER

FIELD

The invention relates generally to controllers and configurations for such controllers.

BACKGROUND

A turbocharger is used to enhance engine performance by compressing intake air supplied to the engine using power obtained from the exhaust airstream of the engine. The basic design includes a turbine placed in line with the exhaust airstream. The turbine rotates as the exhaust airstream flows, and delivers torque via a turbocharger shaft to a compressor that compresses intake air which is fed to the engine. This basic design limits responsiveness, as the energy available to the turbine is waste heat form the engine's fuel, but the ability of the engine to burn fuel is limited by the quantity of compressed intake air, which is itself limited by the energy available to the compressor from the turbine.

An electric motor can be used to enhance responsiveness (and/or other characteristics) by applying torque to the turbocharger shaft when called for or needed. ETurbo, as used herein, refers to a system in which the turbocharger shaft is operably linked to an electric motor configured to supply torque thereto. Under certain conditions (relatively higher engine speeds, for example), the electric motor does not need to apply added torque to obtain desired boost, while under other conditions (relatively lower engine speeds, for example), the electric motor augments the torque generated by the turbine to obtain desired boost from the compressor. In some ETurbo configurations, the electric motor can also act as a generator, obtaining torque from the turbocharger shaft to generate electrical current used, for example, to charge a rechargeable battery.

Many engine control systems are managed by electronic control units (ECUs), which can rely on a variety of control strategies. Approaches used can include proportional-integral-derivative (PID) control, model predictive control (MPC), linear quadratic regulator (LQR), etc. One approach to turbocharger control is to assess the torque balance on the turbocharger shaft. The sum of torques (output via the compressor, received via the turbine, lost to friction, and added or subtracted by the ETurbo) act on the inertia of the combined compressor, turbine and turbocharger shaft assembly, resulting in a change of turbocharger shaft speed. System information can be processed and the effect of various actions on turbocharger shaft speed may be understood using the torque balance.

The compressor has an upper limit of compressor speed. Operating at or above this upper limit can damage and/or accelerate aging of the compressor or other components of the turbocharger. Within some model-based engine control strategies, one approach to the ETurbo control has typically been to provide a setpoint (such as a torque setpoint) for operation to the ETurbo. The ETurbo has its own, independent controller that converts the torque setpoint to a controllable metric such as electric current applied to the motor that couples to the turbocharger shaft. Meanwhile, the original equipment manufacturer (OEM) engine control strategy in a separate ECU directly or indirectly monitors compressor speed. When compressor speed nears its upper limit, the ECU may communicate to the ETurbo Controller to reduce the torque setpoint used or to interrupt operation of the ETurbo. The separate ETurbo controller and ECU introduce latency to the control system, creating a risk of compressor overspeed conditions arising. The separate controllers also introduce the possibility that failure of the communication link, or failure in the ECU controlling the torque setpoint, or any errors or failures affecting inputs used by the ECU to generate the setpoint or monitor compressor speed, can lead to overspeed events. New and alternative methods and systems for controlling ETurbo operation are desired to provide safe, fault-tolerant solutions that are readily compatible with model-based engine control.

OVERVIEW

The present inventors have recognized that a problem to be solved is the need to control ETurbo in different ways at different points in the operating timeline of a turbocharged system.

A first illustrative, non-limiting example takes the form of a system comprising an engine having an air input and an exhaust output; a turbocharger having a compressor coupled to the air input, a turbine coupled to the exhaust output, and an electric motor, wherein the compressor is configured to receive force selectively from either or both of the turbine and the electric motor, the electric motor having an ETurbo controller; an engine control unit (ECU) for controlling operation of the internal combustion engine and the turbocharger; wherein: the ECU is configured to determine and provide a torque control signal and a speed control signal to the ETurbo controller to enable the ETurbo controller to manage operation of the electric motor; and the ETurbo controller is configured to use the torque control signal to manage operation of the electric motor without allowing compressor speed to exceed a maximum speed determined by the speed control signal.

Additionally or alternatively, the system may be configured such that the speed control signal is a speed boundary, and the ETurbo controller is configured to operate as follows: if compressor speed is below the speed boundary, using the force setpoint to control operation of the electric motor; and if compressor speed is at the speed boundary, limiting output force delivered by the electric motor to prevent compressor speed exceeding the speed boundary.

Additionally or alternatively, the system may be configured such that the ECU determines the speed control signal by determining a target boost level in view of the engine speed and calculating a desired compressor speed expected to deliver the target boost level. Additionally or alternatively, the system may be configured such that the ECU is configured to determine the speed control signal to indicate a speed above the desired compressor speed and below an absolute maximum compressor speed.

Additionally or alternatively, the system may be configured such that the ECU is configured to determine the speed control signal to indicate a speed at the desired compressor speed and below an absolute maximum compressor speed.

Additionally or alternatively, the system may be configured such that the ECU determines the speed control signal at a level equaling an absolute maximum speed of the compressor. Additionally or alternatively, the system may be configured such that the speed control signal is a speed setpoint. Additionally or alternatively, the system may be configured such that the speed control signal includes an upper speed boundary and a lower speed boundary. Additionally or alternatively, the system may be configured such that the speed control signal includes each of a speed setpoint, an upper speed boundary and a lower speed boundary.

Additionally or alternatively, the ETurbo controller is configured to operate as follows: in a first mode, operating using the torque setpoint to control the electric motor operation, while limiting compressor speed below an upper speed boundary indicated by the speed control signal; and in a second mode, operating using a speed setpoint indicated by the speed control signal to control the electric motor operation; by: selecting the first mode during an operating time period when communication with the ECU is operable; and selecting the second mode during an operating time period when communication with the ECU is inoperable.

Additionally or alternatively, the system may be configured such that the ETurbo controller stores a maximum safe operation speed limit, and is configured to limit maximum speed of the compressor below the maximum safe operation speed limit regardless of control signals received from the ECU.

Another illustrative, non-limiting example takes the form of a system comprising: an engine having an air input and an exhaust output; a turbocharger having a compressor coupled to the air input, a turbine coupled to the exhaust output, and an electric motor, wherein the compressor is configured to receive torque selectively from either or both of the turbine and the electric motor, the electric motor having an ETurbo controller; an engine control unit (ECU) for controlling operation of the internal combustion engine and the turbocharger; wherein: the ECU is configured to determine and provide a torque control signal, a speed control signal, and a speed boundary to the ETurbo controller to enable the ETurbo controller to manage operation of the electric motor; and the ETurbo controller is configured to use the torque control signal to manage operation of the electric motor without allowing compressor speed to exceed the speed boundary.

Additionally or alternatively, the ETurbo controller is configured to operate as follows: in a first mode, operating using the torque control signal to control the electric motor operation, while limiting compressor speed below the speed boundary; and in a second mode, operating using the speed control signal to control the electric motor operation; by: selecting the first mode during an operating time period when communication with the ECU is operable; and selecting the second mode during an operating time period when communication with the ECU is inoperable.

Additionally or alternatively, the system may be configured such that the ECU determines the speed boundary by determining a target boost level in view of the engine speed and calculating a desired compressor speed expected to deliver the target boost level. Additionally or alternatively, the system may be configured such that the ECU determines the speed boundary at a level equaling a maximum speed of the compressor. Additionally or alternatively, the system may be configured such that the torque control signal indicates a desired torque output from the electric motor. Additionally or alternatively, the system may be configured such that the ECU determines the speed control signal by determining a target boost level in view of the engine speed and calculating a desired compressor speed expected to deliver the target boost level.

Still another illustrative, non-limiting example takes the form of charger system for providing compressed air to an engine having an air input and an exhaust output, comprising: a compressor having an air input for receiving air and an output for issuing compressed air to the air input of the engine; a turbine having air input for receiving air from the exhaust output of the engine to generate torque, the turbine being linked to the compressor to provide the generated torque to the compressor; an electric motor coupled to the compressor and configured to apply force to the compressor to add to the torque provided by the turbine; an ETurbo controller coupled to the electric motor to control operations thereof, the ETurbo controller configured to receive, from an engine control unit (ECU), at least a torque control signal and a speed control signal, and to use the torque control signal to manage operation of the electric motor without allowing compressor speed to exceed a speed boundary determined by the speed control signal.

Additionally or alternatively, the charger system may be configured such that the speed control signal is a speed boundary, and the ETurbo controller is configured to operate as follows: if compressor speed is below the speed boundary, using the force control signal to control operation of the electric motor; and if compressor speed is at the speed boundary, limiting output force delivered by the electric motor to prevent compressor speed exceeding the speed boundary.

Additionally or alternatively, the ETurbo controller is configured to operate as follows: in a first mode, operating using the force control signal to control the electric motor operation, while limiting compressor speed below an upper compressor speed boundary; in a second mode, operating using the speed control signal to control the electric motor operation; determining whether communication with the ECU is operable and: selecting the first mode during an operating time period when communication with the ECU is operable; or selecting the second mode during an operating time period when communication with the ECU is inoperable.

Another illustrative, non-limiting example takes the form of a system comprising: an engine having an air input and an exhaust output; a turbocharger having a compressor coupled to the air input, a turbine coupled to the exhaust output, and an electric motor, wherein the compressor is configured to receive force selectively from either or both of the turbine and the electric motor, the electric motor having an ETurbo controller; an engine control unit (ECU) for controlling operation of the internal combustion engine and the turbocharger; wherein: the ECU is configured to determine and provide a power control signal and a speed control signal to the ETurbo controller to enable the ETurbo controller to manage operation of the electric motor; and the ETurbo controller is configured to use the power control signal to manage operation of the electric motor without allowing compressor speed to exceed a maximum speed determined by the speed control signal.

Additionally or alternatively to the above system and charger system examples, the ECU may be configured to perform a model predictive control calculation to determine the force control signal or the power control signal. Additionally or alternatively to the above system and charger system examples, the ECU may be configured to perform performs a proportional-integral-differential analysis to determine the force control signal or the power control signal.

Additionally or alternatively to the above system and charger system examples, the engine may be an internal combustion engine. Additionally or alternatively to the above system and charger system examples, the ETurbo controller may be configured to implement a lower speed boundary.

An illustrative, non-limiting method example takes the form of a method of operating a system including each of an engine having an air input and an exhaust output; a turbocharger having a compressor coupled to the air input, a turbine coupled to the exhaust output, and an electric motor, wherein the compressor is configured to receive force selectively from either or both of the turbine and the electric motor, the electric motor having an ETurbo controller; and an engine control unit (ECU) for controlling operation of the internal combustion engine and the turbocharger; the method comprising the ECU determining and providing a torque control signal and a speed control signal to the ETurbo controller to enable the ETurbo controller to manage operation of the electric motor; and the ETurbo controller using the torque control signal to manage operation of the electric motor without allowing compressor speed to exceed a maximum speed determined by the speed control signal.

Additionally or alternatively, the speed control signal is a speed boundary, and the method further includes, if compressor speed is below the speed boundary, the ETurbo using the force setpoint to control operation of the electric motor; and if compressor speed is at the speed boundary, the ETurbo limiting output force delivered by the electric motor to prevent compressor speed exceeding the speed boundary.

Additionally or alternatively, the ECU determines the speed control signal by determining a target boost level in view of the engine speed and calculating a desired compressor speed expected to deliver the target boost level.

Additionally or alternatively, the ECU determines the speed control signal to indicate a speed above the desired compressor speed and below an absolute maximum compressor speed. Additionally or alternatively, the ECU determine the speed control signal to indicate a speed at the desired compressor speed and below an absolute maximum compressor speed. Additionally or alternatively, the ECU determines the speed control signal at a level equaling an absolute maximum speed of the compressor.

Additionally or alternatively, the speed control signal is a speed setpoint. Additionally or alternatively, the speed control signal includes an upper speed boundary and a lower speed boundary. Additionally or alternatively, the speed control signal includes each of a speed setpoint, an upper speed boundary and a lower speed boundary.

Additionally or alternatively, the method includes the ETurbo controller operating as follows: in a first mode, operating using the torque setpoint to control the electric motor operation, while limiting compressor speed below an upper speed boundary indicated by the speed control signal; and in a second mode, operating using a speed setpoint indicated by the speed control signal to control the electric motor operation; by: selecting the first mode during an operating time period when communication with the ECU is operable; and selecting the second mode during an operating time period when communication with the ECU is inoperable. Additionally or alternatively, the ETurbo controller stores a maximum safe operation speed limit, and is configured to limit maximum speed of the compressor below the maximum safe operation speed limit regardless of control signals received from the ECU.

Another illustrative, non-limiting example takes the form of a method of operating a system having an engine having an air input and an exhaust output; a turbocharger having a compressor coupled to the air input, a turbine coupled to the exhaust output, and an electric motor, wherein the compressor is configured to receive torque selectively from either or both of the turbine and the electric motor, the electric motor having an ETurbo controller; and an engine control unit (ECU) for controlling operation of the internal combustion engine and the turbocharger; the method comprising the ECU determining and providing a torque control signal, a speed control signal, and a speed boundary to the ETurbo controller to enable the ETurbo controller to manage operation of the electric motor; and the ETurbo controller using the torque control signal to manage operation of the electric motor without allowing compressor speed to exceed the speed boundary.

Additionally or alternatively, the method includes operating the ETurbo controller as follows: in a first mode, operating using the torque control signal to control the electric motor operation, while limiting compressor speed below the speed boundary; and in a second mode, operating using the speed control signal to control the electric motor operation; by: selecting the first mode during an operating time period when communication with the ECU is operable; and selecting the second mode during an operating time period when communication with the ECU is inoperable.

Additionally or alternatively, the ECU determines the speed boundary by determining a target boost level in view of the engine speed and calculating a desired compressor speed expected to deliver the target boost level. Additionally or alternatively, the ECU determines the speed boundary at a level equaling a maximum speed of the compressor. Additionally or alternatively, the torque control signal indicates a desired torque output from the electric motor. Additionally or alternatively, the ECU determines the speed control signal by determining a target boost level in view of the engine speed and calculating a desired compressor speed expected to deliver the target boost level.

Yet another illustrative, non-limiting example takes the form of a charger system for providing compressed air to an engine having an air input and an exhaust output, the system having a compressor having an air input for receiving air and an output for issuing compressed air to the air input of the engine; a turbine having air input for receiving air from the exhaust output of the engine to generate torque, the turbine being linked to the compressor to provide the generated torque to the compressor; an electric motor coupled to the compressor and configured to apply force to the compressor to add to the torque provided by the turbine; and an ETurbo controller coupled to the electric motor to control operations thereof, the method comprising the ETurbo controller receiving, from an engine control unit (ECU), at least a torque control signal and a speed control signal, and the ECU using the torque control signal to manage operation of the electric motor without allowing compressor speed to exceed a speed boundary determined by the speed control signal.

Additionally or alternatively, the speed control signal is a speed boundary, and the method includes, if compressor speed is below the speed boundary, the ETurbo using the force control signal to control operation of the electric motor; and if compressor speed is at the speed boundary, the ETurbo limiting output force delivered by the electric motor to prevent compressor speed exceeding the speed boundary. Additionally or alternatively, the ETurbo may further determine whether the compressor speed is below or at the speed boundary.

Additionally or alternatively, the method may include the ETurbo controller determining whether communication with the ECU is operable and, if so, selecting a first mode of operation or, if not, selecting second mode of operation, wherein in the first mode, the ETurbo controller uses the force control signal to control the electric motor operation, while limiting compressor speed below an upper compressor speed boundary; and, in the second mode, the ETurbo controller uses the speed control signal to control the electric motor operation.

A further illustrative, non-limiting example takes the form of a method of operating a system having an engine having an air input and an exhaust output; a turbocharger having a compressor coupled to the air input, a turbine coupled to the exhaust output, and an electric motor, wherein the compressor is configured to receive force selectively from either or both of the turbine and the electric motor, the electric motor having an ETurbo controller; and an engine control unit (ECU) for controlling operation of the internal combustion engine and the turbocharger; wherein the method comprises the ECU determining and providing a power control signal and a speed control signal to the ETurbo controller to enable the ETurbo controller to manage operation of the electric motor; and the ETurbo controller using the power control signal to manage operation of the electric motor without allowing compressor speed to exceed a maximum speed determined by the speed control signal.

Additionally or alternatively to these method examples, the method may comprise the ECU performing a model predictive control calculation to determine the force control signal or the power control signal. Additionally or alternatively to these method examples, the method may comprise the ECU performing a proportional-integral-differential analysis to determine the force control signal or the power control signal. Additionally or alternatively to these method examples, the engine may be an internal combustion engine Additionally or alternatively to these method examples, the method may comprise the ECU performing the ETurbo controller may also implement a lower speed boundary.

This overview is intended to introduce the subject matter of the present patent application. It is not intended to provide an exclusive or exhaustive explanation of the invention. The detailed description is included to provide further information about the present patent application.

BRIEF DESCRIPTION OF THE DRAWINGS

In the drawings, which are not necessarily drawn to scale, like numerals may describe similar components in different views. Like numerals having different letter suffixes may represent different instances of similar components. The drawings illustrate generally, by way of example, but not by way of limitation, various embodiments discussed in the present document.

DETAILED DESCRIPTION

Figure 1:
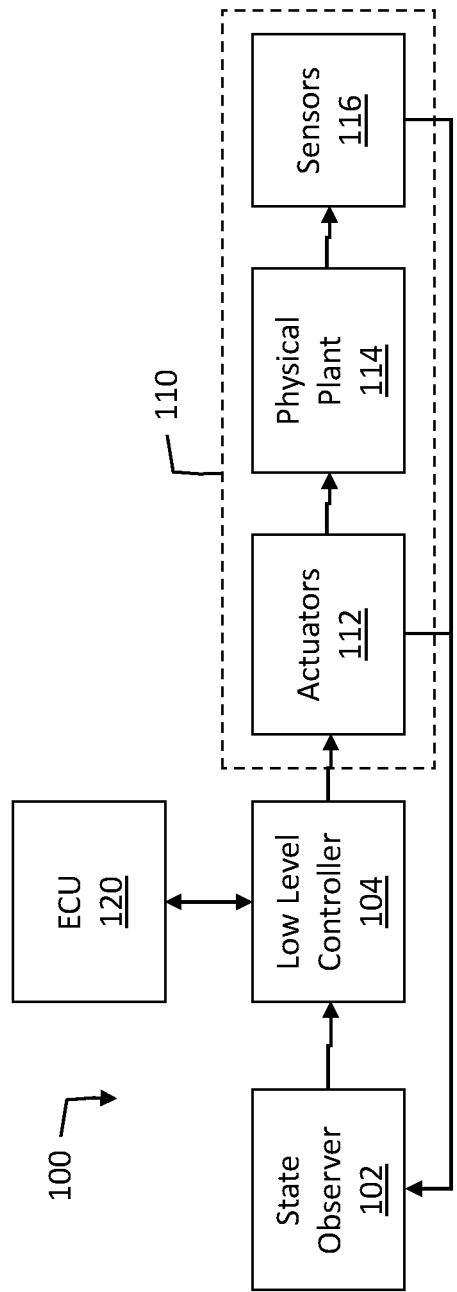
FIG. 1 shows a model of an operational control system.

FIG. 1 illustrates a general control architecture, which is to be described relative to an engine and/or vehicle. A control apparatus is shown at 100 and includes a state observer 102, which feeds a set of current state variables x(k) to the optimizer 104. The optimizer calculates a solution for process parameters that can be applied to a set of actuators 112, which in turn control operation of the physical plant 114. The set of actuators may apply to control, for example and without limitation, fuel or other injectors, variable nozzle turbine position, throttle valve, engine brake, after-treatment (including exhaust), exhaust gas recirculation (EGR), turbocharger, the waste gate (WG) actuator position (stroke), position of the recirculation valve actuator, position of the variable compressor geometry actuator; and/ or other valve, actuators, etc., and combinations thereof. Some examples may include more than one control unit for separate subsystems, such as by having a separate controller for an ETurbo subsystem to control an ETurbo motor; in an illustrative example, the optimizer 104 provides control signal(s) to the ETurbo controller separately from other actuators.

The physical plant 114 may be, for example and without limitation, an internal combustion engine, whether diesel or gasoline, or a subsystem thereof, such as a turbocharger, the system airpath as a whole, catalysts, etc.

A plurality of sensors 116 are provided. In an overall system, sensors 116 may include, for example, and without limitation, one or more of sensors detecting manifold absolute pressure (MAP), mass air flow (MAF), EGR flow, turbo speed, exhaust pollutants, engine speed, fuel quantity, boost pressure, etc. Additional monitored parameters may include, for example, waste gate (WG) normalized opening, recirculation valve (RCV) normalized opening, and/or a variable geometry compressor configuration. Such sensors may be, for example, configured to sample the underlying parameter being sensed and provide the result of such samples to the state observer 102. The state observer 102 may record the underlying sensed parameters, as well as actuator positions, over time to provide history of the system operation. Where a separate ETurbo controller is present, the monitored parameters may also include any parameters reported by the ETurbo controller, such as a torque or current consumption metric and/or shaft rotational speed, for example.

In a specific implementation, the sensor 116 outputs can be captured in the state observer 102 and analyzed in accordance with one or more models of engine behavior. For example, an airflow model can be used to calculate various pressures and temperatures throughout the airflow system without necessarily measuring at each position therein. By so doing, the number of sensors needed can be limited, and the sensors that are provided can be in standardized positions providing robust operation. Thus, for example, boost pressure (pressure downstream of the compressor in a turbocharged system) may be determined using a other sensed parameters and an air flow model, rather than by direct sensing. The calculated boost pressure can then be used to calculate control solutions in the model-based controller.

The state observer 102 and optimizer 104 may be, for example, implemented in a microcontroller configured to operate on a set of stored instructions for performing a state observation and optimization routine. In another example, an application specific integrated circuit (ASIC) may provide state observer functions, which can include the capture or accumulation of data from the actuators 112 and/or sensors 116, which in turn may be read periodically by a microcontroller configured with stored instruction sets for performing a control and/or optimization calculation using, for example, model predictive control (MPC) cost functions, linear quadratic regulator (LQR) control, proportional integral derivative (PID) control, or other control algorithms. The optimizer 104 may be integrated into, or provided separately from, an on-board diagnostics system (not shown) that can be used to record diagnostic variables and present them, as needed to the user or to store for later analysis, both of which may additionally be integrated, if desired, into the overall vehicle processing unit.

The output of the analysis is used to control the actuators 112 to operate the plant in a manner to minimize the distance of operating parameters from one or more target output values for the controllable outputs or physical plant operating characteristics. For example, the targets may be any of target boost pressure, target pressure difference over the compressor, target air mass flow or a combination thereof. For example, with MPC functions, the distance to target or reference values for the one or more output values (or resulting operating characteristics) is minimized, thus optimizing performance. As an example, a traditional MPC cost function formation may be as shown in Equation 1:

$$J_{MPC} = \min \Sigma_{k=1}^{P} \|y_{r,k} - y_k\|_{w_1} + \|u_{d,k} - u_k\|_{w_2}.$$ [Eq. 1]

Where $u_{d,k}$ corresponds to the desired profile for the manipulated variable, $u_k$ stands for the manipulated variable, k denotes discrete time instance, and P stands for the prediction horizon of the predictive controller. In this example, $y_{r,k}$ and $y_k$ represent the output reference and measured value, respectively, and $W_1$ and $W_2$ specify the weighting terms. For simplicity the k terms may be omitted in subsequent equations herein. The traditional MPC cost function is minimized in operation in order to provide optimal control to the physical plant. Such a process may be performed by the optimizer 104.

In another example, a PID controller can be used to account for proportional, integral, and derivative differences from a target operating point. The proportional difference may indicate current state, integral difference may identify a process shift over time, and derivative difference may indicate the direction of changes in operation. With PID control, a proportional difference is minimized while monitoring to ensure that the integral and derivative differences do not indicate changing performance which may, after further iterations, cause the proportional difference to increase. The control parameters output to the actuators 112 are, for a PID controller, adjusted to reduce or minimize the distance of actual performance from one or more targets on an iterative basis. The optimizer 104 may use PID control instead of MPC, for example. LQR control may be used instead, if desired, applying similar concepts.

Figure 2:
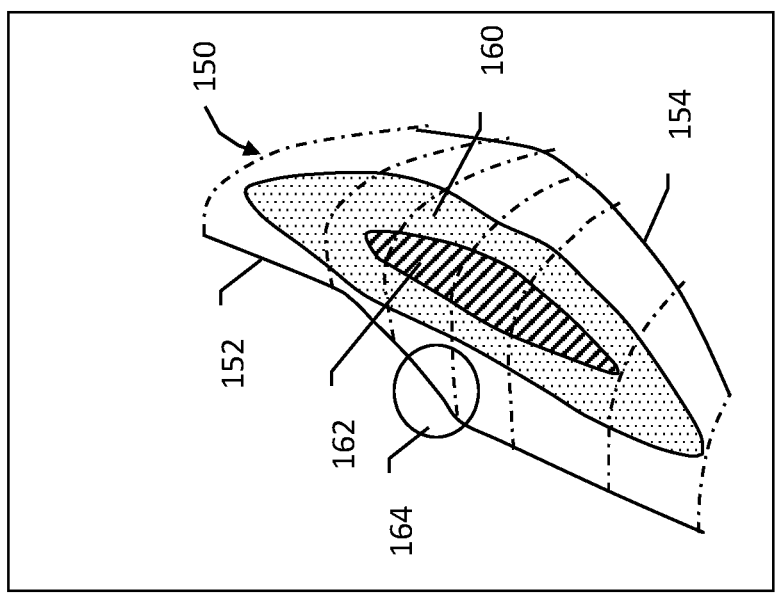
FIG. 2 shows a compressor map.

FIG. 2 shows an illustrative and simplified compressor map. The compressor map uses corrected air mass flow as the X-axis, and the pressure ratio of the compressor as the Y-axis. Several turbocharger speed lines 150 cross the graph and are associated with different compressor speeds. Boundary conditions are included, with a surge line 152 on the left side of the drawing, and a choke line 154 on the right side of the drawing. The surge 152 line indicates the maximum pressure the turbocharger can generate at a given mass flow. The choke line 154 indicates the maximum amount of mass flow at a given pressure ratio. Operation outside of these boundaries 152, 154 is avoided to prevent degraded (and/or unpredictable) operation as well as potential damage to components. Region 164 is highlighted in FIG. 2. Within region 164, the surge line 152 slopes such that, when operating near the surge line 152, a turbocharger that has an increase in speed may cross the surge line 152, treating (at least temporarily) other variables as fixed. Therefore, when operating in region 164, it may be useful to configure a control system to prevent surge due to a change in turbocharger speed.

The efficiency of a turbocharger reflects the ability to compress the air without adding excessive heat. The higher the efficiency, the cooler the outlet temperature for a given boost pressure (though still exceeding ambient temperature). Efficiency islands are shown in the graphic at 160 and 162, with each "island" defining combinations of factors resulting in improved efficiency. For example, operating inside the boundary 160 may correlate to efficiency at or above 65%, and inside island 162 may correlate to an efficiency of 75% or higher. The compressor map in FIG. 2 is simplified; an actual compressor map may include more lines to provide greater granularity.

For a given turbocharger installation, testing can be performed at a test stand to establish the compressor map, and the ECU is then loaded with data representative of the compressor map, whether as a look-up table, a set of equations, in any other suitable fashion. The ECU may include both programmable parameters, which can be modified without requiring reloading of the software, and non-programmable parameters that are fixed except when the overall software is upgraded. In some installations, the compressor map or other calibration-related parameters are treated as programmable parameters that can be, for example, modified at a test stand without requiring reloading of the overall software/control package.

Factors for use in control, such as values used in MPC, PID and/or LQR are then derived using the compressor map and other system characteristics, as well as, at least in some examples, user preferences or inputs. In use, the system is subject to several competing goals, including maximizing efficiency at a given turbo speed and air mass flow, as well as a target boost pressure, for example.

As used herein, ETurbo refers to a system having an electric motor that is operable to provide torque to the turbocharger shaft. ETurbo may improve the responsiveness, efficiency, or other characteristics of the system, and optimizes engine performance at times when traditional turbocharger operations, which rely on exhaust gas flow for power and/or torque, are unable to compress air going into the engine sufficiently to reach desired boost. For example, at low engine speeds, the exhaust gas flow is relatively lower and may not generate sufficient pressure to drive the turbine sufficient to spin the compressor effectively. By using an electric motor to augment operation of the compressor, ETurbo provides additional control, efficiency and responsiveness. Some examples of design for and use of an ETurbo are shown in US PG Pat. Pub. No. 2009/0000298 and U.S. Pat. Nos. 6,637,205 and 6,705,084, the disclosures of which are incorporated herein by reference.

An ETurbo, as used herein, is distinct from a system having a first compressor driven only by a turbine in the exhaust airstream and a second compressor driven only by an electric motor. In an ETurbo system, a turbocharger shaft is configured to receive torque from each of a turbine in the exhaust airstream and an electric motor. A second compressor, such as one driven directly by the drivetrain of the engine or by a separate electric motor, may be used in addition to the ETurbo in some examples, the ETurbo refers specifically to the inclusion of more than one source of drive torque for a single compressor.

Figure 3:
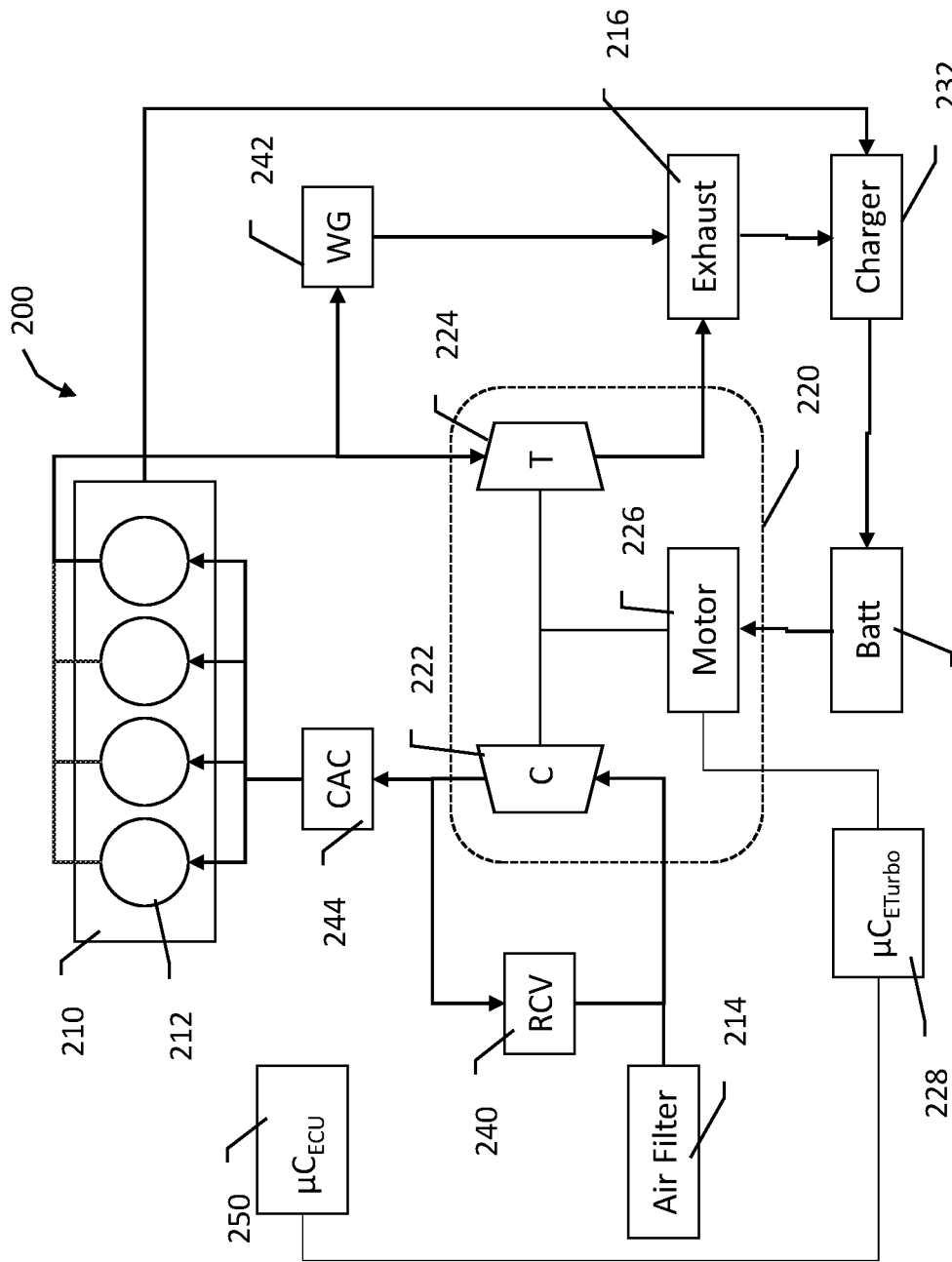
FIG. 3 schematically shows an ETurbo system and engine.

FIG. 3 schematically shows an ETurbo system and engine. A system is shown at 200 in FIG. 3, with an engine 210 shown having one or more cylinders 212. The engine 210 may be, for example and without limitation, an internal combustion engine (diesel, gasoline, propane, natural gas, or any other suitable fuel, for example). The engine 210 receives incoming air which is filtered at 214, and generates output exhaust 216.

A control and optimization system for the engine 210 is provided with a number of components shown; additional components (such as a throttle and fuel supply) are omitted to focus on the air flow into and out of the engine 210. An ETurbo 220 is provided, comprising a compressor 222 coupled to the incoming air flow, following the air filter 214, and a turbine 224 in the exhaust airstream coming from the engine 210. A basic turbocharger operation has the turbine 224 rotating using air pressure in the exhaust airstream, and providing torque to the compressor 222 to compress the incoming air, which improves efficiency and/or other characteristics of performance in the engine 210.

A motor 226 is also provided in the ETurbo, and is coupled to the drive shaft between the turbine 224 and compressor 222. The motor 226 provides additional torque onto the drive shaft for the compressor to augment its operation using energy stored in a battery 230. In some examples, the motor 226 may be used to slow the drive shaft as well, thereby recovering energy that can be routed back to the battery 230, which can be referred to as a generator mode. The battery 230 may be a dedicated, rechargeable battery for use exclusive to the ETurbo, or it may also be used for other electrical applications as desired. A charger 232 may also or instead current to the battery 230 to charge it, using, for example and without limitation, energy recovered in the exhaust airflow, or using energy captured from the engine 210 as it operates. The motor 226 is coupled to an ETurbo controller 228, which may be, for example and without limitation, a microcontroller, an ASIC, or microprocessor.

The ETurbo controller 228 is connected for control purposes to an ECU 250. Such connection may take any suitable form (wireless, optical or wired, for example). In some implementations, the communicative coupling of the ETurbo controller 228 and ECU 250 will be provided via a controller area network (CAN) bus, though this need not be the case. A dedicated connection may be provided instead between ETurbo controller 228 and ECU 250. Communications may include commands, confirmations, data, etc., as suited to the system.

Additional components may be provided, including, for example and without limitation, a wastegate (WG) 242 that allows exhaust airflow to bypass the turbine 224, under control of the ECU. A recirculation valve (RCV) 240 may also be provided, allowing the output of the compressor 222 to be fed back to its input under certain circumstances, such as to avoid compressor surge. A blowoff valve (not shown) may be used instead of or in addition to the RCV. A charge air cooler (CAC) 244 may be provided to cool the output from the compressor 222 before entering the engine 210, a process that can be used to enhance efficiency of the engine.

In operation, a typical control strategy is for the ECU 250 to determine a target boost pressure to be generated by the compressor 222. Various actuators, including the WG 242, can be used to control how much force is provided to the turbine 224 from the exhaust airflow, to thereby control torque to the compressor 222. At lower engine speeds, the ETurbo may be used to apply added torque from the motor 226 to the drive shaft to of the compressor 222, to increase the speed at which the compressor 222 turns, increasing the boost provided, and optimizing engine 210 performance. With higher engine speeds, the turbine 224 can be adequately driven by the exhaust airflow to spin the compressor 222 fast enough to achieve the target boost pressure without added torque from the motor 226. At even higher speeds, the WG 242 can be opened to avoid spinning the compressor 222 (or turbine 224) faster than may be desired. The RCV 240 and WG 242 may be controlled to avoid changing the turbocharger speed unnecessarily, which can cause low cycle fatigue.

When excess power is available from the exhaust gas airflow, the ETurbo may be used as a generator, for example, to charge a battery that supplies power to the ETurbo when needed. However, as power is drawn out of the system by use of the ETurbo as a generator, the torque available to spin the compressor is reduced. For some examples, the present inventors have found that in marginal conditions, an ETurbo generator mode can create a negative feedback loop, in which the power drawn by the ETurbo causes boost pressure to drop, in turn reducing the exhaust gas airflow and further reducing torque on the turbocharger shaft. Thus a minimum speed limitation related to this use of the ETurbo as a generator may be useful.

Generally, an OEM supplies the engine system and a specialty manufacturer supplies the ETurbo. The OEM may perform various calibration setting operations at an engine test stand, and will write calibration settings to the ECU 250, for example modifying programmable parameters stored thereon. However, access to the ETurbo controller 228 is less readily available to the OEM. The ETurbo may instead simply receive control signals from the ECU 250, rather than being accessible to calibration software used for example at a test stand. This separation of tasks and controls provides various efficiencies in other areas of design and development, but can impede optimal and/or safe operation of the ETurbo. In some examples herein, the manner of controlling the ETurbo controller 228 is configured to allow calibration of the ECU 250 to be performed in a manner agnostic to the ETurbo controller itself, as further detailed below. In addition, the control signals supplied by the ECU 250 can include both operating targets and one or more secondary factors to limit operation of the ETurbo. For example, the ETurbo may be given a maximum speed, whether related to an upper safety boundary or to avoid compressor surge, and/or a minimum speed to prevent overuse of the ETurbo generator function, and an operating target related to desired boost pressure; in other examples, a combination of two of these three factors (maximum, minimum, and setpoint) may be provided to the ETurbo by the ECU. In some examples, the ETurbo may also have internal stored limits, such as a maximum safe operation speed limit.

Figure 4:
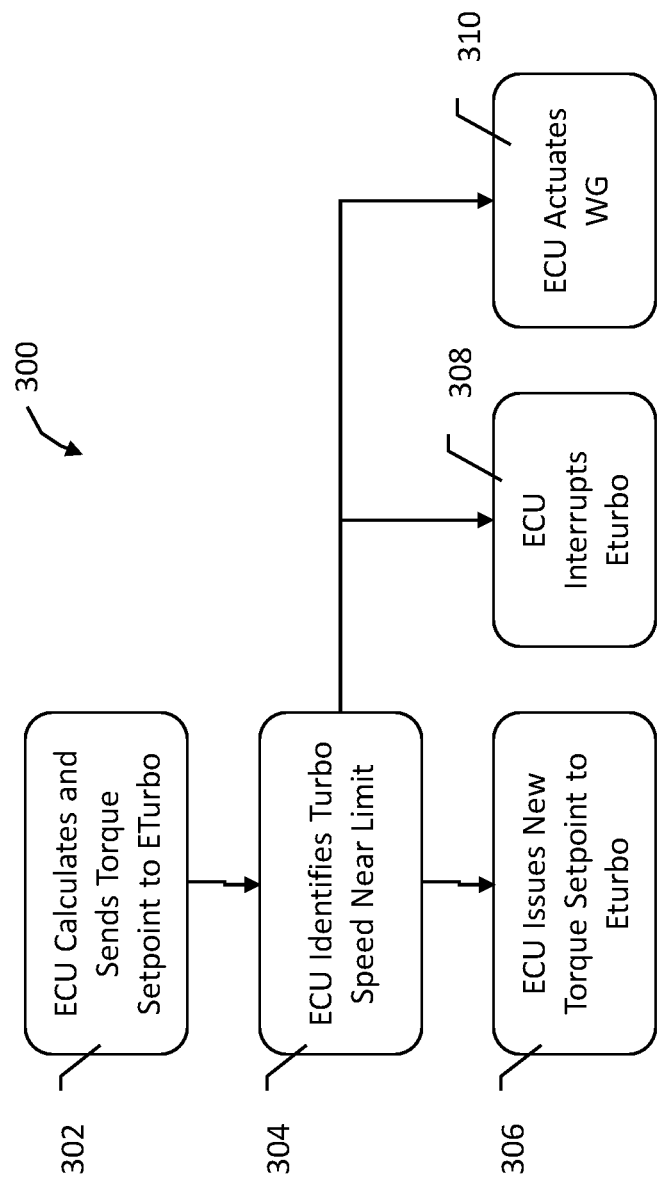
FIGS. 4-7 are a block flow diagrams for an illustrative control methods.

FIG. 4 is a block flow diagram for a control method 300. At block 302, the ECU calculates and sends a torque setpoint to the ETurbo, indicating how much torque the ETurbo is to supply to the compressor. The torque setpoint can be used to manage torque applied to the compressor from the turbocharger shaft in a variety of ways. The torque setpoint is intended to affect the applied torque; it need not be issued or set in terms or units of actual torque. Instead, a torque setpoint may be defined by the current supplied to the ETurbo motor for applying added torque to the turbocharger shaft, for example, or may refer to the actual torque output by the ETurbo motor, or to a calculation of the torque consumed by the compressor given particular inputs form the turbine and/or ETurbo motor, again referencing the torque balance on the turbocharger shaft. A torque setpoint may also be calculated in terms of power; adjusting the power delivered to or by the turbocharger shaft would also affect the torque balance, such that a setpoint calculated in terms of power can also be considered a torque setpoint. Other setpoint types may be used; any setpoint or control signal that the ETurbo motor would use to assess or modify the torque balance on the turbocharger shaft, except by reference to turbocharger shaft speed, can be a torque setpoint. The torque setpoint may be calculated by the ECU after taking into consideration the desired level of boost to be generated by the compressor, environmental factors (incoming air characteristics such as humidity and temperature, for example), measured, predicted or modeled exhaust gas pressure or speed, and other statuses, conditions or demands within the system. The ECU may also consider such factors as the turbocharger size or other configuration features. A PID, MPC, or other control method may be used, including reference to the compressor map, to determine the torque setpoint.

Maximum turbocharger speed is a defined feature for the ECU at block 304. More specifically, the compressor will typically be rated for a maximum speed, not to be exceeded without risking excessive wear or outright failure. In addition, regardless of actual compressor speed, the operating point of the system may be close to the surge line on the compressor map, meaning that an increase in compressor speed could trigger undesired surge. A maximum turbocharger speed can thus be calculated by the ECU either by reference to a safety boundary or by reference to some other factor such as proximity to a compressor surge line.

At block 304, the ECU may identify conditions in which the turbo (or compressor) speed is nearing a maximum limit. The ECU can take one or several ameliorative actions, including issuing a new force setpoint to the ETurbo thereby reducing the ETurbo applied force, torque, power, or current, as indicated at 306. In an extreme circumstance, the ECU may interrupt ETurbo operation, as indicated at 308, issuing a command to reduce the motor output to zero; alternatively the ECU command the ETurbo to switch to a generator mode, thereby counteracting torque on the turbocharger shaft. A sudden change of this sort can subject the compressor to low cycle fatigue, however, if needed to avoid overspeed such a step 308 may be used. At block 310, the ECU may also actuate the WG, to bypass exhaust flow going to the turbine, again reducing the force delivered to the compressor. Actuating the WG is not necessarily preferred, as the WG will typically be rated for a certain number of actuation steps during its lifetime. To the extent the ECU calculates the maximum turbocharger speed by reference to the compressor map or surge line, the RCV or a blow off valve may be opened to reduce boost pressure and avoid surge, as alternatives or in addition to any of blocks 306, 308, or 310.

While each of 308 and 310 is available, block 306 would be preferred as a means to provide control over the turbocharger. However, the communication required at block 306 may introduce delay due to system latency; even with processor or controller operating at high clock speeds, an approach as shown at 306 will have inherent lag. Failure of the communication, necessitating retry, can add still more latency. The ECU may, in this setup, be required to act early to prevent the compressor from exceeding its maximum speed.

A further complicating factor arises if the ETurbo controller is also tasked with monitoring the compressor speed. If that is the case, to avoid overspeed of the compressor, the ETurbo controller would measure compressor speed and report to the ECU over the CAN bus. In response, the ECU would determine whether overspeed is a current risk, and would modify a control signal sent back to the ETurbo controller, as well as, potentially, modifying a control signal to another actuator in the system (such as by opening the WG via block 310, for example). As a result of the various dependencies present, the solution in FIG. 4 may not be optimal.

Figure 5:
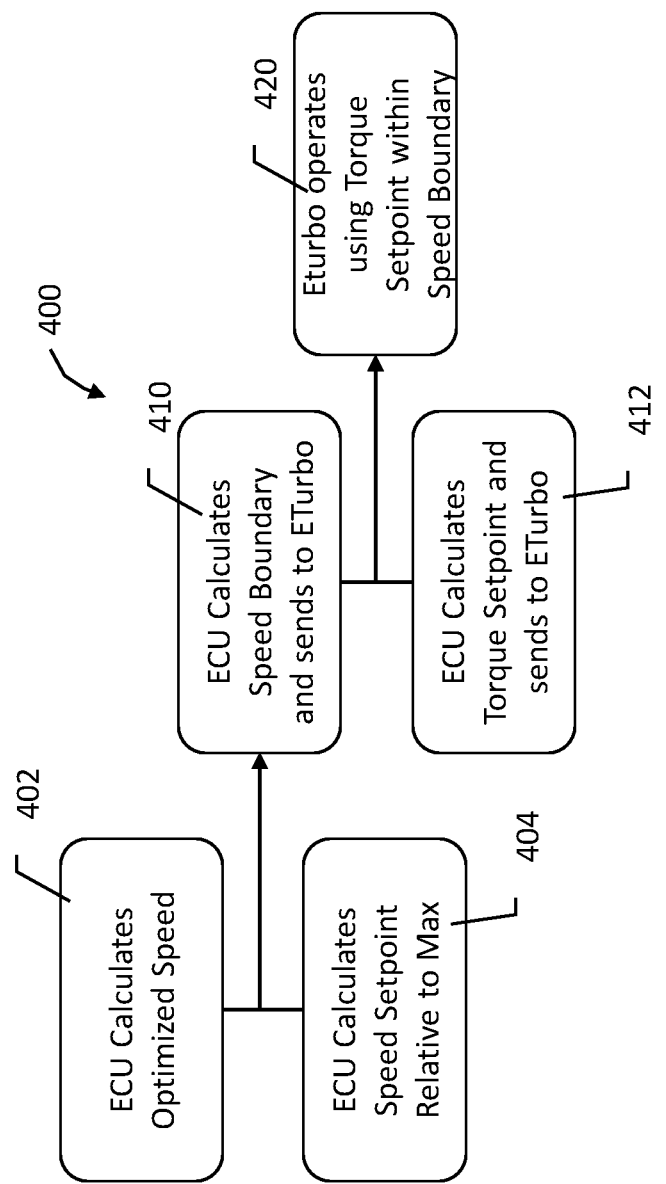

FIG. 5 is a block flow diagram for an illustrative method 400 that may improve on the process of FIG. 4. At block 402, the ECU calculates a speed setpoint for the compressor using an optimization or other control analysis, for example using PID or MPC or other control calculation methods. For example, the optimized speed at block 402 may be a speed calculated via MPC analysis that will achieve a desired boost pressure to optimize engine performance (defined by any of efficiency, power, etc.). The ECU also calculates a speed setpoint relative to the maximum compressor speed, as indicated at 404, using reference to any suitable input including, for example and without limitation, a safety boundary and/or the compressor map and surge line. The setpoint at block 404 may be equal to or reduced, by some predetermined margin or percentage, from the actual compressor maximum speed determined by a safety or other boundary condition.

Next, the ECU calculates a speed boundary at block 410, and communicates the speed boundary to the ETurbo controller. The speed boundary may be communicated as a speed control signal. For example, if both 402 and 404 are operated in the method, the ECU selects a speed boundary that is the lesser of the setpoints calculated in blocks 402 and 404. The ECU also calculates a torque setpoint and communicates the torque setpoint to the ETurbo, as indicated at 412. The torque setpoint may be communicated as a control signal. The torque setpoint may take any suitable form/units, as discussed above. The torque setpoint may be calculated by the ECU after taking into consideration the desired level of boost to be generated by the compressor, environmental factors (incoming air characteristics such as humidity and temperature, for example), measured, predicted or modeled exhaust gas pressure or speed, and other statuses, conditions or demands within the system. As described previously, the torque setpoint may be determined by reference to the torque balance on the turbocharger shaft. A PID, MPC, or other control method may be used, including reference to the compressor map, to determine the torque setpoint. Some examples may refer to or otherwise use a power setpoint rather than a torque setpoint, if desired.

At block 420, the ETurbo receives the speed control signal (communicating the speed boundary) and torque control signal (communicating the torque setpoint) and implements a control solution for the motor wherein the torque setpoint is used to control the motor for so long as the compressor speed remains within the speed boundary. As a result, the ECU does not have to provide ongoing, time sensitive control over the ETurbo to protect the compressor from overspeed conditions or to avoid deleterious conditions such as surge. In addition, when operating in response to various incoming disturbances, the compressor speed (at least to the extent it is augmented by ETurbo motor force) is limited to a quantity near the speed setpoint determined by the ECU at block 404.

While compressor overspeed relative to a safety boundary is one risk, there are other operating conditions in which the approach of FIG. 5 may be useful. In one example, the ECU may determine that the engine is idling, and may effectively issue a speed setpoint, rather than a speed boundary, to the ETurbo. For example the issued torque setpoint may be set relatively high while a relatively low speed boundary is issued (for example, a max torque force setpoint, and a speed boundary at 25% of maximum compressor speed, or other %), which would cause the ETurbo to issue enough torque to operate the compressor at the speed boundary, turning the speed boundary into a setpoint. Doing so may reduce lag when the engine speed is increased by maintaining rotational inertia on the turbocharger shaft. In another example, rather than issuing a speed boundary command, the ECU may designate an output speed control signal as a speed setpoint.

Figure 6:
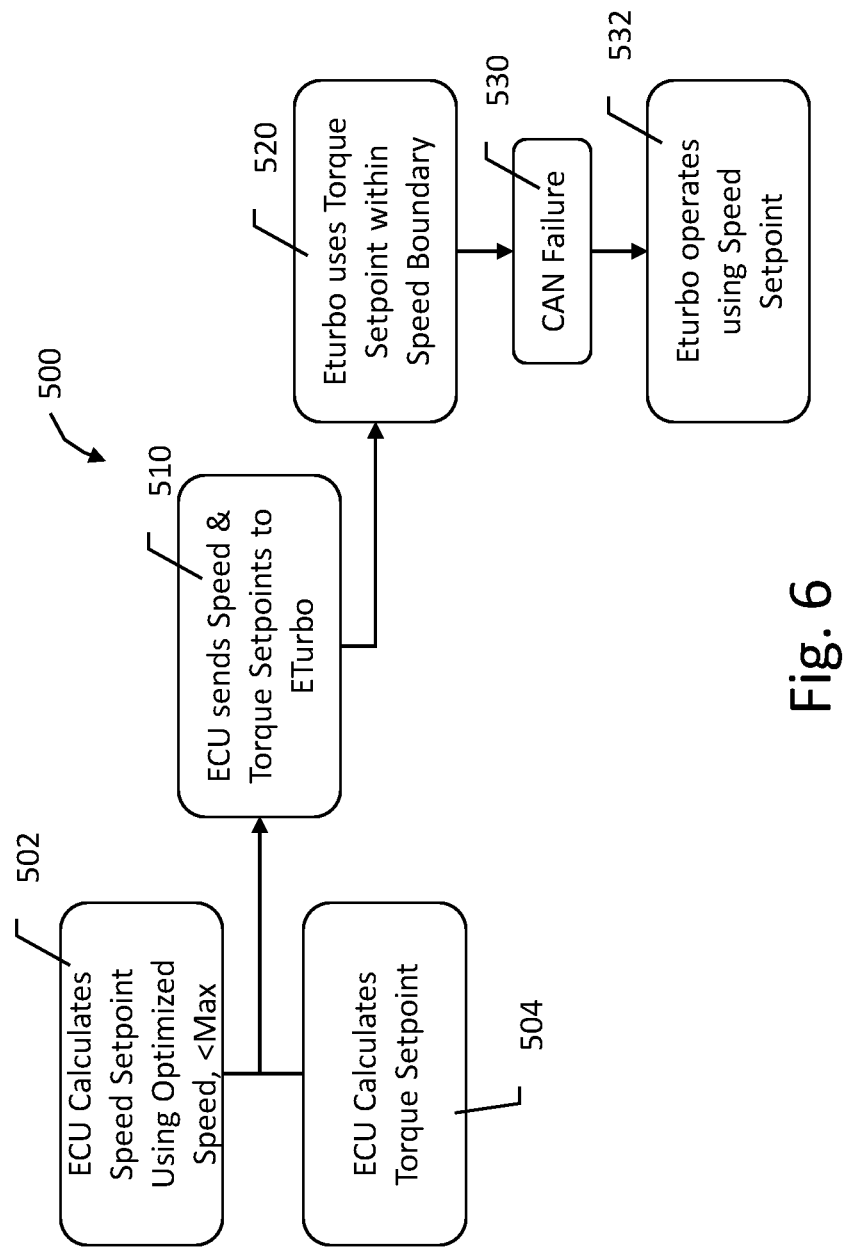

FIG. 6 shows another example. Here, the method 500 has the ECU sending both a speed setpoint and a torque setpoint to the ETurbo as speed and torque control signals. At block 502, the ECU calculates a speed setpoint using an optimization calculation, for example, with a boundary condition ensuring that the speed setpoint is equal to or less than the maximum compressor speed (for example a safety setpoint or set to prevent surge). The ECU also calculates a torque setpoint, as indicated at 504, similar to the preceding examples. The ECU communicates the speed and torque setpoints to the ETurbo controller, as indicated at 510. In a normal operating mode, the ETurbo operates using the torque setpoint, within a speed boundary as indicated at 520. The speed setpoint may be used as the speed boundary in block 520. In the event that the CAN system ceases to operate properly at 530 (such as due to loss of synchronization or other failure), the ETurbo may continue to operate as indicated at 532 by using the speed setpoint, rather than the torque setpoint, to control operations.

In an alternative example, in FIG. 6, the ECU may send each of torque and speed setpoints, as well as a speed boundary as a torque control signal, a speed control signal, and a speed boundary signal, respectively. The speed boundary may be, for example and without limitation, the upper limit of compressor speed, or a boundary set near but below the upper limit of compressor speed. Thus in block 520, the communicated speed boundary is applied to limit compressor speed. The speed setpoint may be used only when block 532 is called, after a failure of the CAN is identified at 530.

In an example, the operation in block 520 may be considered or described as a first operating mode for the ETurbo controller, and the operation in block 532 is considered or described as a second operating mode foe the ETurbo controller. The ETurbo controller can then be configured to select the first operating mode (block 520) when communication with the ECU is operable, or to select the second operating mode (block 532) when communication with the ECU is inoperable.

Figure 7:
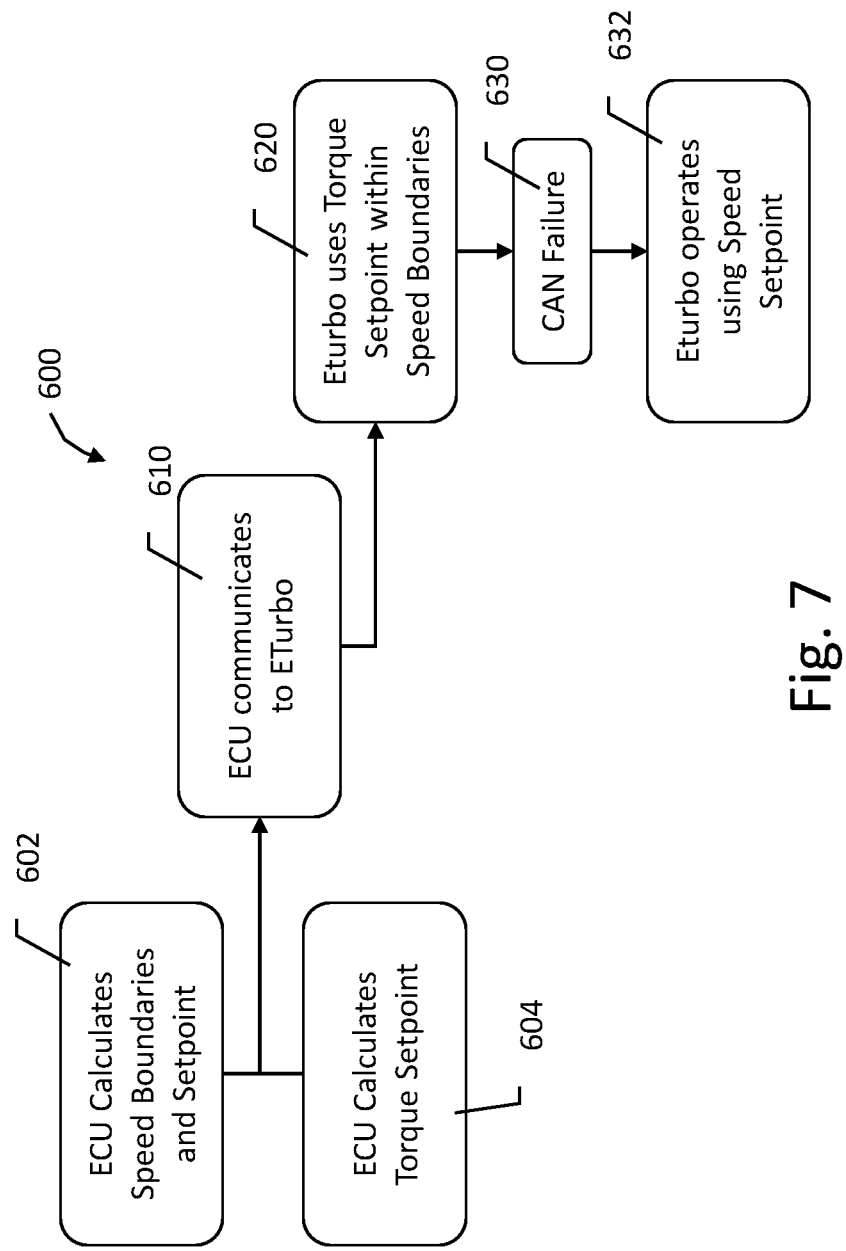

FIG. 7 illustrates another example. Here, the method 600 starts with an ECU calculating speed boundaries at 602. In this example, both upper and lower limits for turbospeed are generated by the ECU. The upper speed limit may be as discussed above, calculating for example by reference to a compressor map, avoiding surge, or by reference to an operational safety threshold.

A lower speed limit may also be set. In some examples, a lower speed limit may be set to prevent a negative feedback loop due to insufficient turbocharger shaft speed, causing a reduction in boost pressure and, in response, a reduction in engine output and exhaust gas pressure, furthering the reduction in applied boost pressure. In some examples, a lower speed limit may be set to prevent loss of power during, for example, transient changes in engine speed (i.e. changing gears, for example). In other examples, a lower speed limit may be set to prevent unsafe or undesired engine operation, such as when operating at high altitude or to ensure appropriate burning of the combustion fuel. A lower speed limit may be set to prevent choke, with reference to the compressor map. A lower speed limit may also be set when, for example, a variable displacement engine is in use; with one or more cylinders of a combustion engine disabled exhaust gas pressures may be insufficient to maintain boost that would be desired when the cylinders are again enabled. The ETurbo may apply torque, including in excess of a torque setpoint, to prevent the lower speed boundary from being crossed; in some examples, the lower speed boundary may be used to determine whether and when an ETurbo generator function is to be disabled without relying, for example, on engine speed reported to the ETurbo by the ECU.

The ECU, in this example, also generates a torque setpoint at block 604, similar to block 504 in FIG. 6. The speed boundaries, speed setpoint, and torque setpoint can each then be communicated to the ETurbo at block 610. As shown at 620, the ETurbo controller uses the torque setpoint within the speed boundaries during normal operation. In the event of CAN failure at 630, the ETurbo controller switches to using the speed setpoint as indicated at 632, similar to block 532, above.

The above detailed description includes references to the accompanying drawings, which form a part of the detailed description. The drawings show, by way of illustration, specific embodiments in which the invention can be practiced. These embodiments are also referred to herein as "examples." In this document, the terms "a" or "an" are used, as is common in patent documents, to include one or more than one, independent of any other instances or usages of "at least one" or "one or more." Moreover, in the following claims, the terms "first," "second," and "third," etc. are used merely as labels, and are not intended to impose numerical requirements on their objects. In the event of inconsistent usages between this document and any documents so incorporated by reference, the usage in this document controls.

The above description is intended to be illustrative, and not restrictive. For example, the above-described examples (or one or more aspects thereof) may be used in combination with each other. Other embodiments can be used, such as by one of ordinary skill in the art upon reviewing the above description. Some examples can include elements in addition to those shown or described. The present inventors also contemplate examples using any combination or permutation of those elements shown or described (or one or more aspects thereof), either with respect to a particular example, or with respect to other examples (or one or more aspects thereof) shown or described herein.

Method examples described herein can be machine or computer-implemented at least in part. Some examples can include a computer-readable medium or machine-readable medium encoded with instructions operable to configure an electronic device to perform methods as described in the above examples. An implementation of such methods can include code, such as microcode, assembly language code, a higher-level language code, or the like. Such code can include computer readable instructions for performing various methods. The code may form portions of computer program products. Further, in an example, the code can be tangibly stored on one or more volatile, non-transitory, or non-volatile tangible computer-readable media, such as during execution or at other times. Examples of these tangible computer-readable media can include, but are not limited to, hard disks, removable magnetic or optical disks, magnetic cassettes, memory cards or sticks, random access memories (RAMs), read only memories (ROMs), and the like.

The Abstract is provided to comply with 37 C.F.R. § 1.72(b), to allow the reader to quickly ascertain the nature of the technical disclosure. It is submitted with the understanding that it will not be used to interpret or limit the scope or meaning of the claims. Also, in the above Detailed Description, various features may be grouped together to streamline the disclosure. This should not be interpreted as intending that an unclaimed disclosed feature is essential to any claim. Rather, inventive subject matter may lie in less than all features of a particular disclosed embodiment. Thus, the following claims are hereby incorporated into the Detailed Description as examples or embodiments, with each claim standing on its own as a separate embodiment, and it is contemplated that such embodiments can be combined with each other in various combinations or permutations. The The claimed invention is:

1. A system comprising:
an engine having an air input and an exhaust output;
a turbocharger having a compressor coupled to the air input, a turbine coupled to the exhaust output, and an electric motor, wherein the compressor is configured to receive force selectively from either or both of the turbine and the electric motor, the electric motor having an ETurbo controller; and
an engine control unit (ECU) for controlling operation of the internal combustion engine and the turbocharger;
wherein:
the ECU is configured to determine and provide a torque control signal and a speed control signal to the ETurbo controller to enable the ETurbo controller to manage operation of the electric motor; and
the ETurbo controller is configured to use the torque control signal to manage operation of the electric motor without allowing compressor speed to exceed a maximum speed determined by the speed control signal.

2. The system of claim 1 wherein the speed control signal is a speed boundary, and the ETurbo controller is configured to operate as follows:
if compressor speed is below the speed boundary, using the torque control signal to control operation of the electric motor; and
if compressor speed is at the speed boundary, limiting output force delivered by the electric motor to prevent compressor speed exceeding the speed boundary.

3. The system of claim 1 wherein the ECU determines the speed control signal by determining a target boost level in view of the engine speed and calculating a desired compressor speed expected to deliver the target boost level.

4. The system of claim 3 wherein the ECU is configured to determine the speed control signal to indicate a speed above the desired compressor speed and below an absolute maximum compressor speed.

5. The system of claim 3 wherein the ECU is configured to determine the speed control signal to indicate a speed at the desired compressor speed and below an absolute maximum compressor speed.

6. The system of claim 1 wherein the ECU determines the speed control signal at a level equaling an absolute maximum speed of the compressor.

7. The system of claim 1 wherein the speed control signal is a speed setpoint.

8. The system of claim 1 wherein the speed control signal includes an upper speed boundary and a lower speed boundary.

9. The system of claim 1 wherein the speed control signal includes each of a speed setpoint, an upper speed boundary and a lower speed boundary.

10. The system of claim 1 wherein the ETurbo controller is configured to operate as follows:
in a first mode, operating using the torque setpoint to control the electric motor operation, while limiting compressor speed below an upper speed boundary indicated by the speed control signal; and
in a second mode, operating using a speed setpoint indicated by the speed control signal to control the electric motor operation;
wherein the ETurbo controller is configured to select between the first mode and the second mode by:
selecting the first mode during an operating time period when communication with the ECU is operable; and
selecting the second mode during an operating time period when communication with the ECU is inoperable.

11. The system of claim 1 wherein the ETurbo controller stores a maximum safe operation speed limit, and is configured to limit maximum speed of the compressor below the maximum safe operation speed limit regardless of control signals received from the ECU.

12. A system comprising:
an engine having an air input and an exhaust output;
a turbocharger having a compressor coupled to the air input, a turbine coupled to the exhaust output, and an electric motor, wherein the compressor is configured to receive torque selectively from either or both of the turbine and the electric motor, the electric motor having an ETurbo controller; and
an engine control unit (ECU) for controlling operation of the internal combustion engine and the turbocharger;
wherein:
the ECU is configured to determine and provide a torque control signal, a speed control signal, and a speed boundary to the ETurbo controller to enable the ETurbo controller to manage operation of the electric motor; and
the ETurbo controller is configured to use the torque control signal to manage operation of the electric motor without allowing compressor speed to exceed the speed boundary.

13. The system of claim 12 wherein the ETurbo controller is configured to operate as follows:
in a first mode, operating using the torque control signal to control the electric motor operation, while limiting compressor speed below the speed boundary; and
in a second mode, operating using the speed control signal to control the electric motor operation;
wherein the ETurbo controller is configured to select between the first mode and the second mode by:
selecting the first mode during an operating time period when communication with the ECU is operable; and
selecting the second mode during an operating time period when communication with the ECU is inoperable.

14. The system of claim 12 wherein the ECU determines the speed boundary by determining a target boost level in view of the engine speed and calculating a desired compressor speed expected to deliver the target boost level.

15. The system of claim 12 wherein the ECU determines the speed boundary at a level equaling a maximum speed of the compressor.

16. The system of claim 12 wherein the torque control signal indicates a desired torque output from the electric motor.

17. The system of claim 12 wherein the ECU determines the speed control signal by determining a target boost level in view of the engine speed and calculating a desired compressor speed expected to deliver the target boost level.

18. A charger system for providing compressed air to an engine having an air input and an exhaust output, comprising:
a compressor having an air input for receiving air and an output for issuing compressed air to the air input of the engine;
a turbine having air input for receiving air from the exhaust output of the engine to generate torque, the turbine being linked to the compressor to provide the generated torque to the compressor;

an electric motor coupled to the compressor and configured to apply force to the compressor to add to the torque provided by the turbine; and an ETurbo controller coupled to the electric motor to control operations thereof, the ETurbo controller configured to receive, from an engine control unit (ECU), at least a torque control signal and a speed control signal, and to use the torque control signal to manage operation of the electric motor without allowing compressor speed to exceed a speed boundary determined by the speed control signal.

19. The system of claim 18 wherein the speed control signal is a speed boundary, and the ETurbo controller is configured to operate as follows:

if compressor speed is below the speed boundary, using the torque control signal to control operation of the electric motor; and if compressor speed is at the speed boundary, limiting output force delivered by the electric motor to prevent compressor speed exceeding the speed boundary.

20. The system of claim 18 wherein the ETurbo controller is configured to operate as follows:

in a first mode, operating using the torque control signal to control the electric motor operation, while limiting compressor speed below an upper compressor speed boundary;

in a second mode, operating using the speed control signal to control the electric motor operation;

wherein the ETurbo controller is configured to select between the first mode and the second mode by:

determining whether communication with the ECU is operable and:

selecting the first mode during an operating time period when communication with the ECU is operable; or selecting the second mode during an operating time period when communication with the ECU is inoperable.

* * * * *